United States Patent
Nelson et al.

(10) Patent No.: US 8,739,479 B1
(45) Date of Patent: Jun. 3, 2014

(54) GRANULAR MATERIAL STORAGE CAPACITY INCREASING DEVICE AND SYSTEM

(71) Applicants: Chris A. Nelson, Harrisburg, SD (US); Chad R. Kramer, Sioux Falls, SD (US); Lucas L. Lorenzen, Sioux Falls, SD (US)

(72) Inventors: Chris A. Nelson, Harrisburg, SD (US); Chad R. Kramer, Sioux Falls, SD (US); Lucas L. Lorenzen, Sioux Falls, SD (US)

( * ) Notice: Subject to any disclaimer, the term of this patent is extended or adjusted under 35 U.S.C. 154(b) by 0 days.

(21) Appl. No.: 14/091,974

(22) Filed: Nov. 27, 2013

(51) Int. Cl.
*E04H 7/00* (2006.01)

(52) U.S. Cl.
USPC .................................. 52/192; 52/86; 52/245

(58) Field of Classification Search
CPC .......... E04B 1/3205; E04B 2001/3276; E04B 2001/3252; E04B 2001/3241; E04B 7/08; E04B 2001/3288; E04B 1/32; E04H 7/22; E04H 7/30
USPC ........... 52/63, 82, 86, 87, 192, 194, 222, 245, 52/247, 302.2, 639, 6
See application file for complete search history.

(56) References Cited

U.S. PATENT DOCUMENTS

| | | | | |
|---|---|---|---|---|
| 3,111,788 A * | 11/1963 | Ouellet | ............. | 52/537 |
| 3,877,186 A * | 4/1975 | Cartier | ............. | 52/82 |
| 4,128,948 A * | 12/1978 | Wood | ............. | 34/500 |
| 4,841,693 A * | 6/1989 | Welsh | ............. | 52/197 |
| 6,223,476 B1 | 5/2001 | Lemoine | | |
| 7,814,714 B2 | 10/2010 | McGary | | |
| 2009/0188184 A1* | 7/2009 | McGary | ............. | 52/192 |

* cited by examiner

*Primary Examiner* — Brian Glessner
*Assistant Examiner* — Brian D Mattei

(57) ABSTRACT

A granular material storage capacity increasing device and system includes a housing including a plurality of roof trusses each including an inner chord. A plurality of panels is attached to the roof structure. Each of the panels extends between and is attached to adjacently positioned ones of the inner chords. Each of the panels is elongated and has a first end, a second end, an upper edge and a lower edge. An upper bend is positioned adjacent to the upper edge and defines an upper flange including the upper edge. A lower bend is positioned adjacent to the lower edge and defines lower flange including the lower edge. A primary bend is positioned between the upper and lower bends. The upper and lower flanges are attached to the inner chord. The primary bend is spaced further from the inner chord than the first and second ends.

13 Claims, 8 Drawing Sheets

US 8,739,479 B1

GRANULAR MATERIAL STORAGE CAPACITY INCREASING DEVICE AND SYSTEM

I hereby claim the benefit under 35 U.S.C. Section 119(e) of U.S. Provisional Application 61/733,321 filed on Dec. 4, 2012.

BACKGROUND OF THE DISCLOSURE

Field of the Disclosure

The disclosure relates to grain storage assemblies and more particularly pertains to a new grain storage assembly for allowing an increase in an effective storage volume of a grain storage housing.

SUMMARY OF THE DISCLOSURE

An embodiment of the disclosure meets the needs presented above by generally comprising a housing with a first side wall and a second side wall. Each of the first and second side walls engaging and extending upwardly from a ground surface. A roof structure is attached to and extends between the first and second side walls. The roof structure includes a plurality of roof trusses each including an inner chord. The roof trusses are laterally spaced from each other. A plurality of panels is attached to the roof structure to define an auxiliary storage capacity above the first and second side walls supported by the roof structure. Each of the panels extends between and is attached to adjacently positioned ones of the inner chords. The panels each are horizontally oriented. Each of the panels is elongated and has a first end, a second end, an upper edge, a lower edge, an inner surface and an outer surface. An upper bend is positioned adjacent to the upper edge and an upper flange is defined between the upper bend and the upper edge. A lower bend is positioned adjacent to the lower edge and a lower flange is defined between the lower bend and the lower edge. A primary bend is positioned between the upper and lower bends. The upper and lower flanges are attached to the inner chord. The primary bend is spaced further from the inner chord than the first and second ends.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
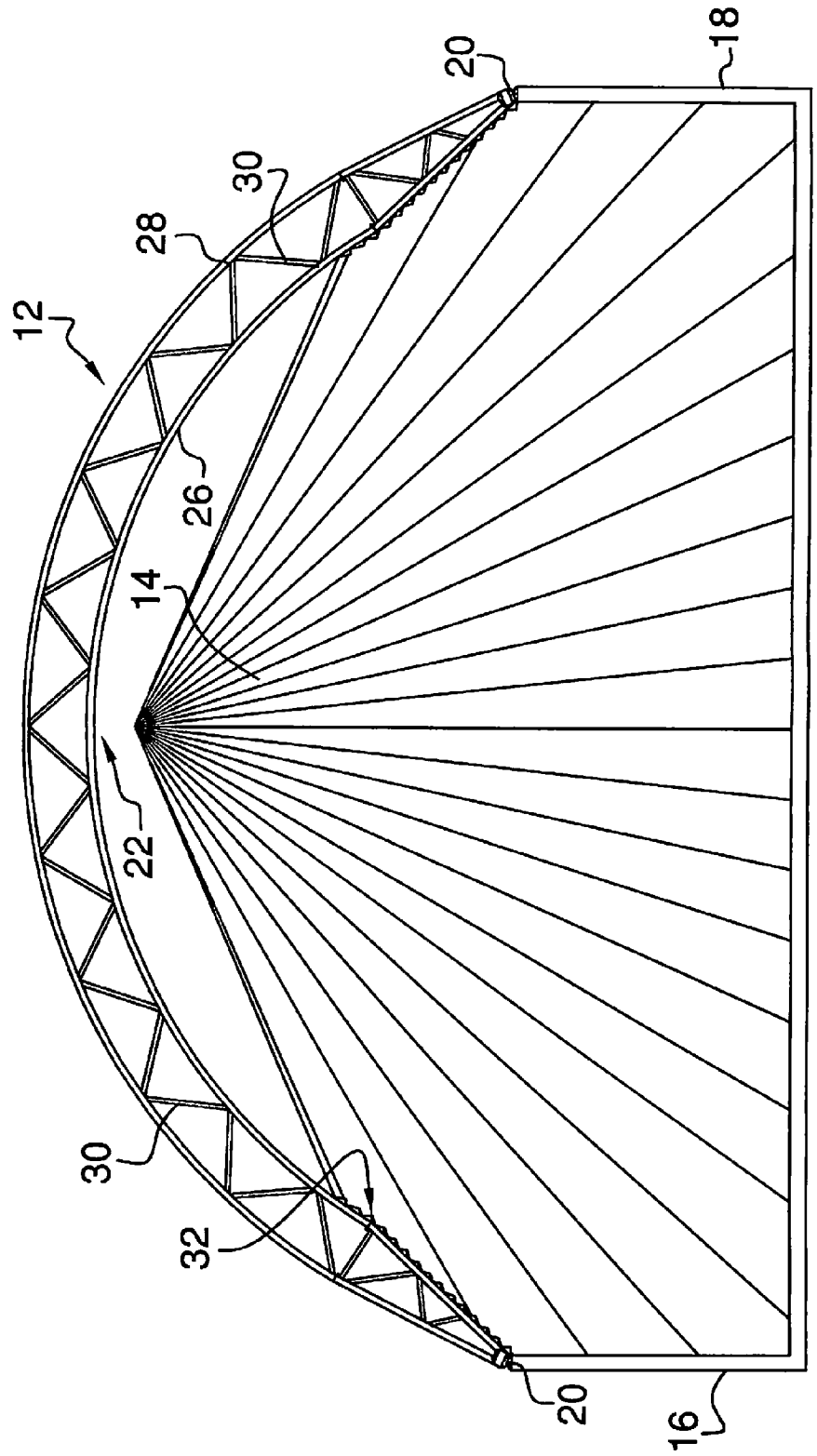
FIG. 1 is a side view of a granular material storage capacity increasing device and system according to an embodiment of the disclosure.
Figure 2:
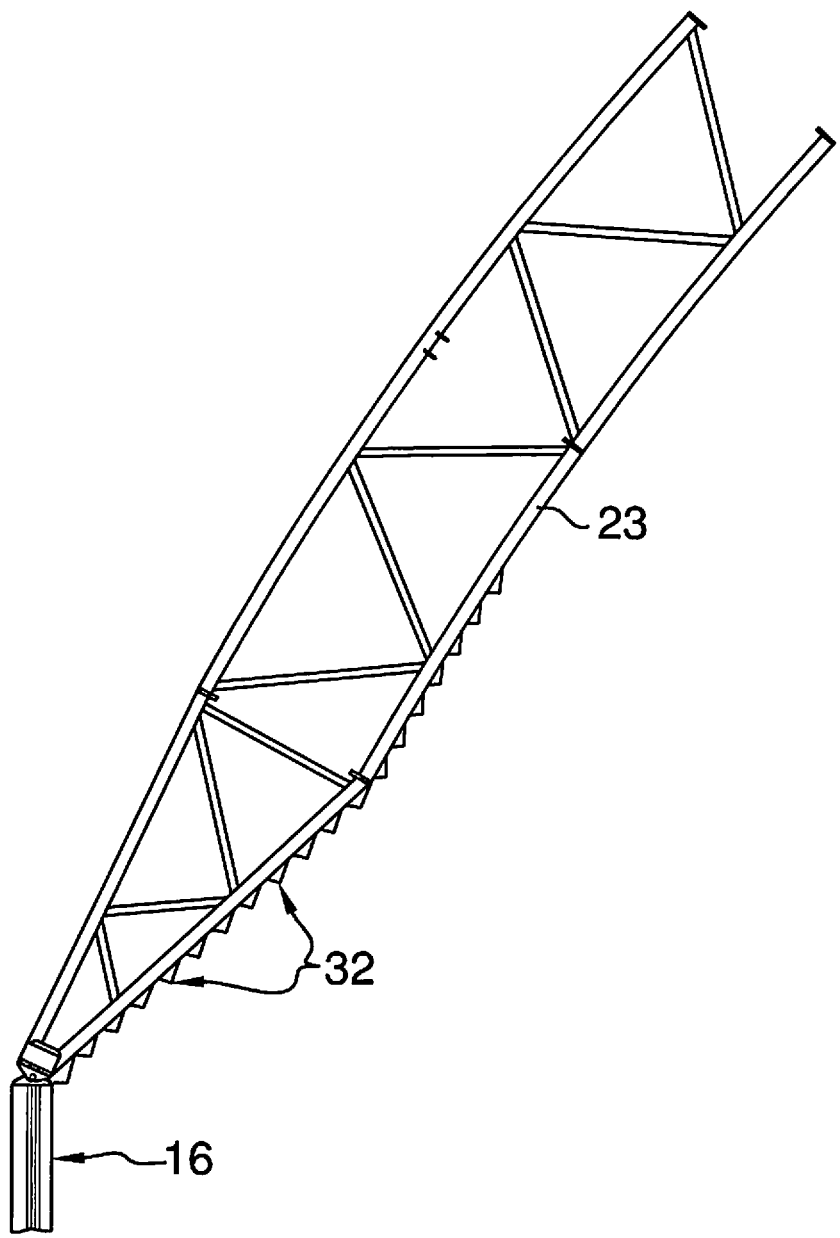
FIG. 2 is a side view of an embodiment of the disclosure.

With reference now to the drawings, and in particular to FIGS. 1 through 8 thereof, a new grain storage assembly embodying the principles and concepts of an embodiment of the disclosure and generally designated by the reference numeral 10 will be described.

As best illustrated in FIGS. 1 through 8, the granular material storage capacity increasing device 10 and system generally comprises a housing 12 including a first side wall 16 and a second side wall 18. Each of the first 16 and second 18 side walls engages and extends upwardly from a ground surface and each of the first and second side walls is vertically oriented and has an upper edge 20. A roof structure 22 is attached to and extends between the first 16 and second 18 side walls. The roof structure 22 engages the upper edges 20 of the first 16 and second 18 side walls. More particularly, the roof structure 22 includes a plurality of roof trusses 24 wherein each of the roof trusses 24 includes an inner chord 26. The roof trusses 24 are spaced from each other. It should be understood that the housing 12 will further include a pair of end walls, not shown, extending between the first 16 and second 18 side walls to form a base wall having a generally rectangular configuration. The roof structure 22 includes inner 26 and outer chords 28 attached together by supports 30 and the trusses 24 may more particularly define hoop trusses. The housing 12 is of conventional nature and a similar structure is disclosed by U.S. Pat. No. 7,814,714, incorporated herein by reference.

Figure 3:
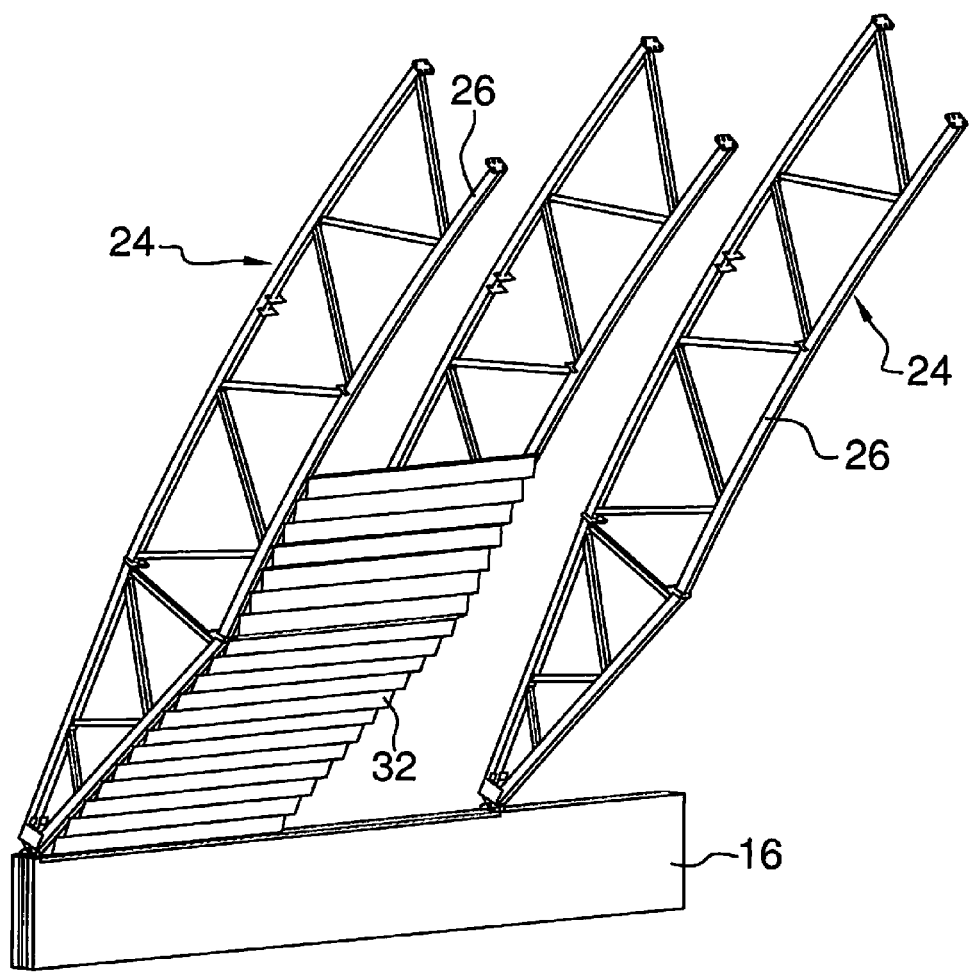
FIG. 3 is a front perspective view of an embodiment of the disclosure.
Figure 4:
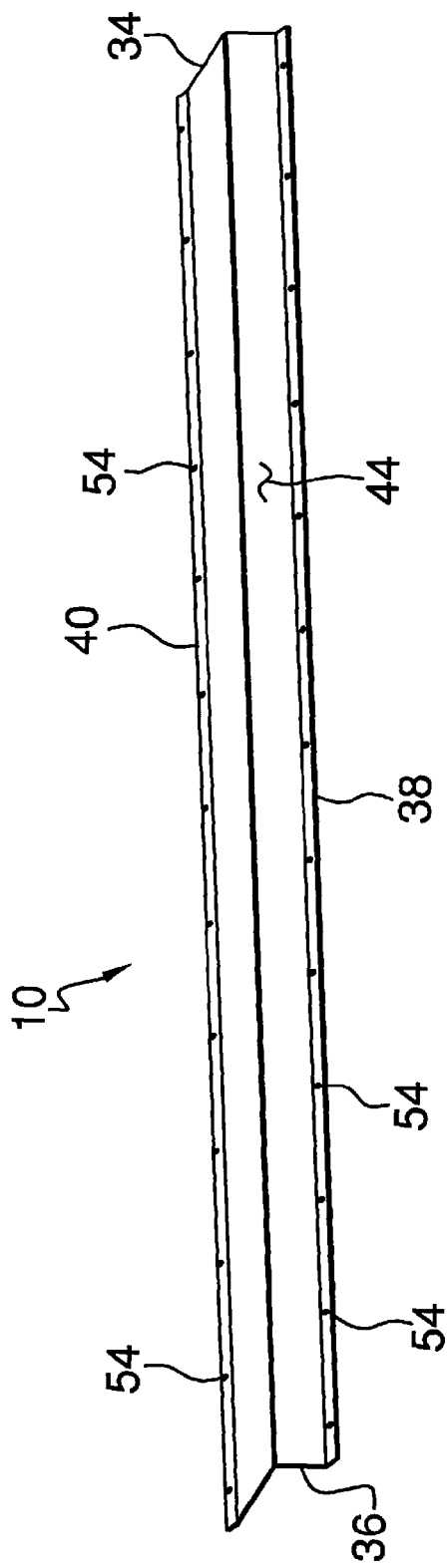
FIG. 4 is a rear view of an embodiment of the disclosure.
Figure 5:
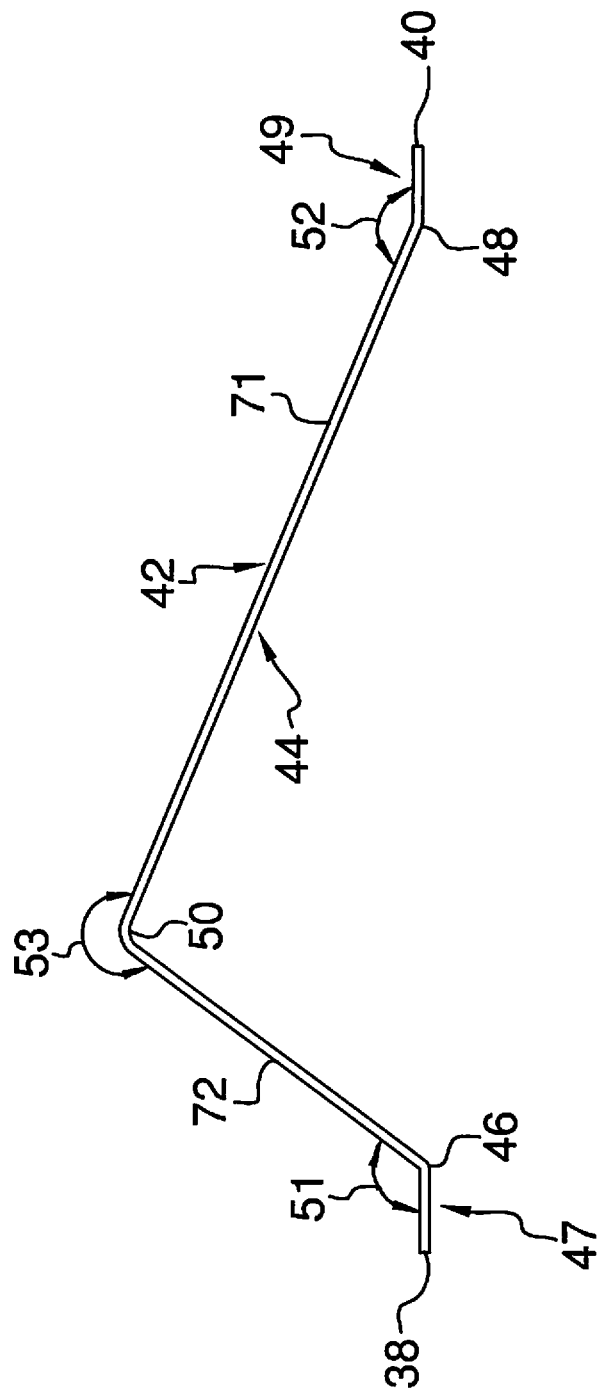
FIG. 5 is a side view of an embodiment of the disclosure.

A plurality of panels 32 is attached to the roof structure 22 to define an auxiliary storage capacity above the first 16 and second 18 side walls supported by the roof structure 22. Each of the panels 32 extends between and is attached to adjacently positioned ones of the inner chords 26 as shown in FIG. 3. The panels 32 may be attached to the inner chords 26 with conventional securing means including bolts, fasteners, brackets and the like extending trough the panels 32 and engaged with the inner chords 26. The panels 32 each are horizontally oriented and overlap each other to form a continuous inner wall extending upwardly along the inner chords 26 to a predetermined height. The panels 32 are attached to the roof structure 22 to define an auxiliary storage capacity above the first 16 and second 18 side walls and which is supported by the roof structure 22. As is well known in the art, granular material 14, when stored, is often limited to the angle of repose of the granular material 14. This angle is dictated by the coefficient of fiction between the particles of the granular material being stored. The granular material 14 may include grain, road salt, sand and the like and each has an angle of repose which limits the height to which it may be piled. Moreover, there are classifications within each category that again must be taken into consideration. Thus, within grain it is known that barley has an angle of repose of 30° while that of wheat is 28°. When filling a conventional storage housing the granular material 14 cannot be piled so high as to rise above the base wall comprising the first 16 and second 18 side wall of the housing 12 because the material 14 would push against an outer covering, not shown, positioned on the outer chords 32. The height limit of the pile must be monitored to ensure that the height and the angle of repose do not combine to spill material over the base wall. The panels 32 are added to the housing 12 to allow the height of the pile to be increased above the base wall which, in turn, increases the overall granular material storage capacity of the housing 12. However, once the pile approaches an apex of the housing 12, filling must stop. For this reason, the panels need not be attached to the inner chords to the apex but may be discontinued at the predetermined height which is equal to the limit of lateral filling of the housing 12 when the material 14 pile is at such a height that no more material 14 may be added to the housing 12.

Each of the panels 32 is elongated and has a first end 34, a second end 36, an upper edge 40, a lower edge 38, an inner surface 42 and an outer surface 44. Generally, the inner surface 42 will be the surface facing inward of the housing 12 while the outer surface 44 will face the inner chords 26. The terms "upper" and "lower" are being used for clarity only as the panels 32 may be oriented as needed with respect to the housing 12. An upper bend 48 is positioned adjacent to the upper edge 40 and an upper flange 49 is defined between the upper bend 48 and the upper edge 40. A lower bend 46 is positioned adjacent to the lower edge 38 and a lower flange 47 is defined between the lower bend 46 and the lower edge 38. A primary bend 50 is positioned between the upper 48 and lower 46 bends. The upper 48 and lower 46 bends each form a flange angle 52, 51, respectively, less than 180° in the inner surface 42 while the primary bend 50 forms a primary angle 53 greater than 180° and less than 270° in the inner surface 42. As such, an obtuse angle is formed in the outer surface 44 at the primary bend 50. More particularly, in the embodiment of FIG. 1, the flange angle 51 of the lower bend 46 is between 115° and 135°, and may more particularly be between 120° and 130°. The flange angle 52 of the upper bend 48 is between 145° and 170° and may more particularly be between 152° and 162°. The primary angle 53 may be between 235° and 270° and more particularly between 250° and 267°.

Figure 8:
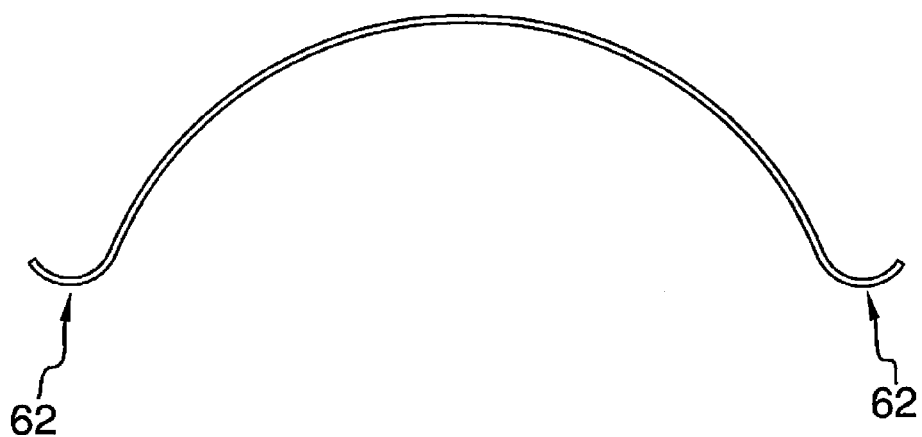
FIG. 8 is a side view of an embodiment of the disclosure.

The outer surface 44 of the upper flange 49 is contoured to match the inner surface 42 of the lower flange 47 and the outer surface 44 of the lower flange 47 is contoured to match the inner surface 42 of the upper flange 49. In this manner, the upper 49 and lower 47 flanges of adjacent panels 32 may be overlapped and nested with each other. As shown in FIG. 8, which will be discussed below, this may be particularly useful where the upper 49 and lower 47 flanges are rounded and will help account for non-linear inner chord 26 structures which are conventionally arcuate.

In general, a plane is defined extending through and is coextensive with the upper 48 and lower 46 bends. A distance between the primary bend 50 and the plane is greater than a distance between the plane and the lower 38 and upper 40 ends. This places the primary bend 50 further away from the inner chord 26 than the lower 38 and upper 40 ends when the panel 32 is mounted on the inner chord 26. The panel 32 of FIG. 1 includes a first length measured from the upper bend 48 to the primary bend 50 that is greater than a second length measured from the lower bend 46 to the primary bend 50. The first length defines a first leg 71 of the panel 32 and the second length defines a second leg 72 of the panel. More particularly, the first length may be at least 1.4 times the second length. This structure resists bending, warping or crushing of the panel 32 when the panel 32 is subjected to gravitational forces from material 14 piled within the housing 12. The first length may generally be between 7.0 inches and 10.0 inches, while the second length may generally be between 3.0 inches and 6.0 inches. Each of the upper 49 and lower 47 flanges may have a length between 0.50 inches and 4.0 inches and more particularly between 0.75 inches and 1.50 inches. Each of the upper 49 and lower 47 flanges has a plurality of apertures 54 extending therethrough for receiving the securing means for coupling the panels 32 to the inner cord 26. The apertures 54 of one panel 32 are alignable with the apertures 54 of the other panels 32 to also allow coupling of the panels 32 together along the upper 49 and lower 47 flanges to prevent material 14 from passing between abutting panels 32. The panels 32 may each have a width substantial enough to attach the panels 32 to adjacent ones of the trusses 24 though it should be understood that the panels 32 may have a width to allow each panel to be attached to and extend between more than two of the trusses 24.

Figure 6:
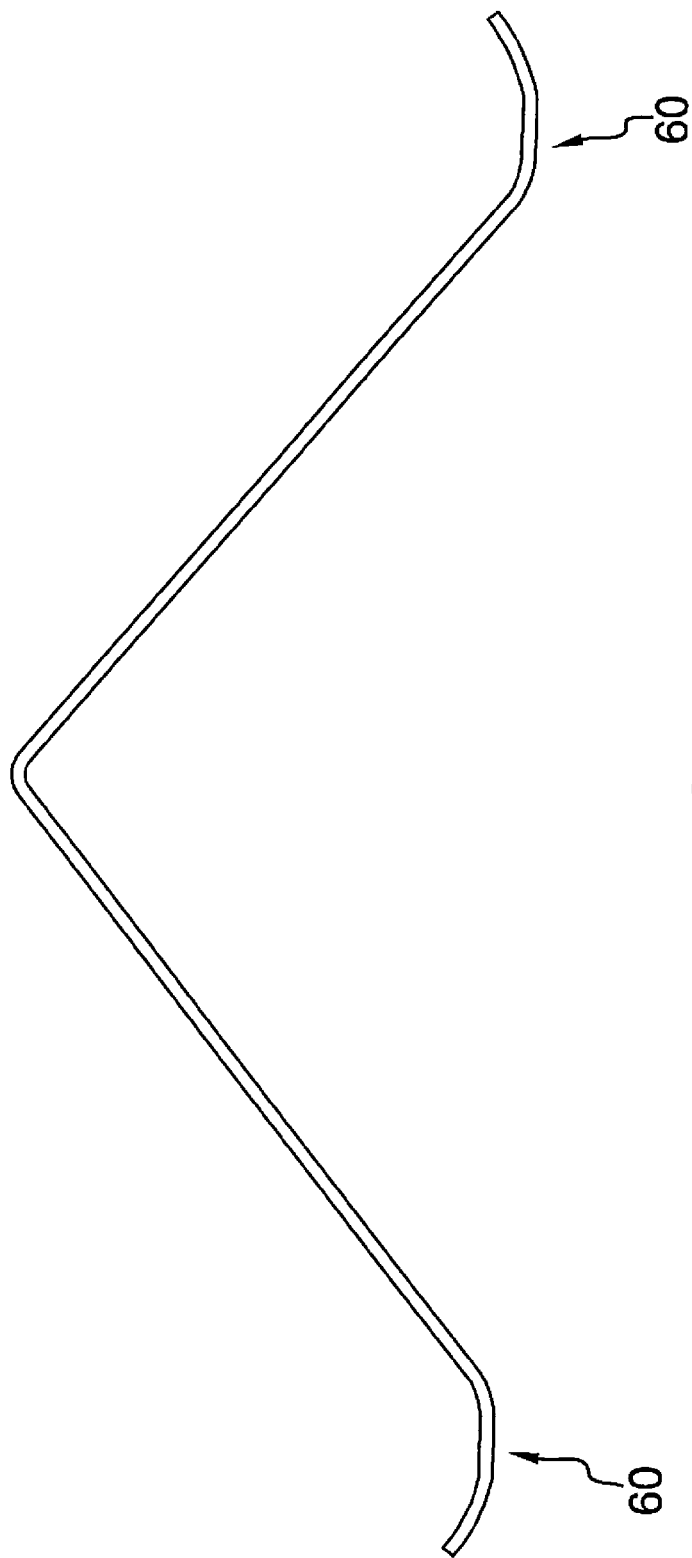
FIG. 6 is a side view of an embodiment of the disclosure.
Figure 7:
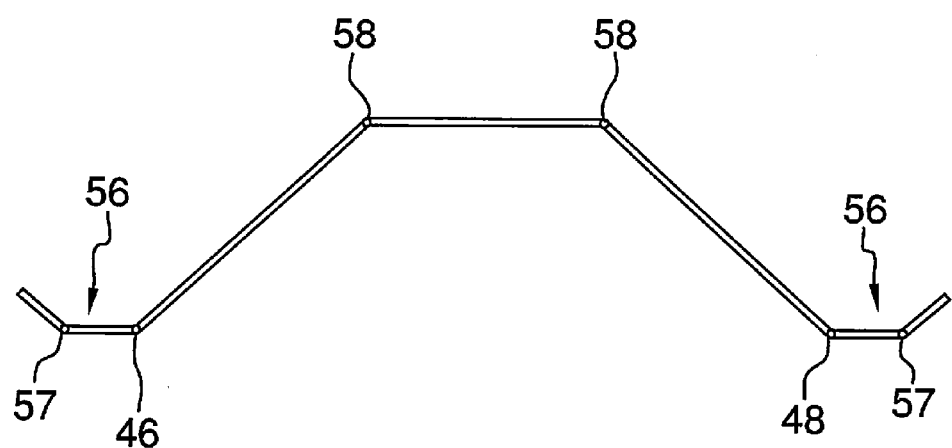
FIG. 7 is a side view of an embodiment of the disclosure.

FIGS. 1-5 and 7 depict variations of the panel including planar sections while FIGS. 6 and 8 include some rounded features. More particularly, FIG. 7 includes flanges 56 having bends 57 therein resulting in ends angled upwardly from the upper 48 and lower 46 bends to assist in nesting of the flanges 56. This version further includes a pair of primary bends 58 which are spaced from each other to form a trapezoid along the primary bends 58, the lower bend 46, the upper bend 48 and a line extending between the upper 48 and lower 46 bends. The trapezoid may be an isosceles trapezoid. FIGS. 6 and 8 include rounded flanges 60, 62 to aid in the nesting of the panels 32 when mounted along an arcuate surface. FIG. 6 retains a triangular shape between the flanges 60 while FIG. 8 includes a rounded shape between the flanges 62. The rounded flanges 60, 62 of FIG. 8 may be formed on radii between 0.40 inches and 0.80 inches while a central portion of that panel between the rounded flanges may be formed on a radius between 4.0 inches and 8.0 inches In use, the panels 32 are placed on the inner chords 26 of the housing 12 as shown to form an extended interior wall extending upwardly from the first 16 and second 18 side walls. The panels 32 are shaped to resist being deformed when material 14 placed in the housing 12 begins to exert force on the panels 32. With the version shown in FIGS. 1-5, the upper edge 40 of each panel 32 is placed on the inner chords 26 vertically above a corresponding lower edge 38. This orients the first leg 71 of a triangle, between the upper bend 48 and the primary bend 50, facing downwardly into the housing 12 to direct the force of the material 14 generally lateral, or horizontal, with respect to the trusses 24 to counter the angle of repose of the granular material 14. Specifically, the primary angle 53 may be selected such that the first leg 71 forms an angle with respect to a horizontal plane approximately equal to 90° minus the angle of repose. For instance, if the angle of repose is 23°, the panel 32 may be shaped such that the inner surface 42 of the first leg 71 forms a 67° angle with a horizontal plane when the lower 47 and upper 49 flanges are attached to the inner chord 26. Such an angle will cause the gravitational and frictional forces of the material 14 to be displaced laterally. Because one objective is to laterally displace the forces of the material 14, it should be understood that the primary angle 53 may be altered depending on the angle of the inner chord 26. Thus, panels of various angles may be used together as the angle of the inner chord 26 varies. Alternatively, the panels 32 may be provided each having an identical shape but with a primary angle 53 chosen such that an overall composite effect of lateral displacement is obtained. This direction of the gravitational and frictional forces of the material 14 will inhibit deformation of the panels 32 and prevent upward pressure on the trusses 24. The panels 32 allow the material 14 to be piled above the first 16 and second 18 side walls and thereby increase the capacity of the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A grain storage system comprising:
    a housing including;
        a first side wall and a second side wall, each of said first and second side walls engaging and extending upwardly from a ground surface;
        a roof structure being attached to and extending between said first and second side walls, said roof structure including a plurality of roof trusses, each of said roof trusses including an inner chord, said roof trusses being laterally spaced from each other;
    a plurality of panels being attached to said roof structure to define an auxiliary storage capacity above said first and second side walls supported by said roof structure, each of said panels extending between and being attached to adjacently positioned ones of said inner chords, said panels each being horizontally oriented;
    each of said panels being elongated, each of said panels having;
        a first end, a second end, an upper edge, a lower edge, an inner surface and an outer surface;
        an upper bend being positioned adjacent to said upper edge, an upper flange being defined between said upper bend and said upper edge;
        a lower bend being positioned adjacent to said lower edge, a lower flange being defined between said lower bend and said lower edge; and
        a primary bend being positioned between said upper and lower bends, said upper and lower flanges each being attached to said inner chord, said primary bend being spaced further from said inner chord than said first and second ends.

2. The grain storage system according to claim 1, wherein said upper and lower flanges of adjacently positioned ones of said panels overlap to form a continuous inner wall extending upwardly along said inner chords to a predetermined height.

3. The grain storage system according to claim 1, wherein said upper and lower bends each form a flange angle in said inner surface each forming angles less than 180°, said primary bend forming a primary angle greater than 180° and less than 270° in said inner surface, wherein an obtuse angle is formed in said outer surface at said primary bend.

4. The grain storage system according to claim 1, wherein said lower bend forms an angle in said inner surface between 115° and 135°, said upper bend forming an angle in said inner surface between 145° and 170°, said primary angle forming an angle in said outer surface between 235° and 270°.

5. The grain storage system according to claim 1, wherein said lower bend forms an angle in said inner surface between 120° and 130°, said upper bend forming an angle in said inner surface between 152° and 162°, said primary angle forming an angle in said outer surface between 250° and 267°.

6. The grain storage system according to claim 1, wherein said outer surface of said upper flange is contoured to match said inner surface of said lower flange and said outer surface of said lower flange is contoured to match said inner surface of said upper flange.

7. The grain storage system according to claim 6, wherein each of said upper and lower flanges are rounded.

8. The grain storage system according to claim 1, wherein each of said of said panels further includes:
    a first length measured from said upper bend to said primary bend being greater than a second length measured from said lower bend to said primary bend, said first length defining a first leg and said second length defining a second leg.

9. The grain storage system according to claim 8, said first length being at least 1.4 times said second length.

10. The grain storage system according to claim 8, wherein said first length is between 7.0 inches and 10.0 inches and said second length is between 3.0 inches and 6.0 inches.

11. The grain storage system according to claim 10, wherein each of said upper and lower flanges have a length between 0.50 inches and 4.0 inches.

12. The grain storage system according to claim 10, wherein each of said upper and lower flanges have a length between 0.75 inches and 1.50 inches.

13. The grain storage system according to claim 1, wherein each of said upper and lower flanges having a plurality of apertures extending therethrough, said apertures of one of said panels being alignable with apertures of adjacent ones of said panels.

* * * * *